United States Patent Office 2,776,937
Patented Jan. 8, 1957

2,776,937
PURIFICATION OF DIHYDRIC PHENOLS

Leo J. Filar, Wilmington, Del., assignor to Hercules Powder Company, Wilmington, Del., a corporation of Delaware No Drawing. Application December 24, 1953,
Serial No. 400,371

10 Claims. (Cl. 202—42)

This invention relates to the purification of dihydric phenols by azeotropic distillation.

It is known to purify dihydric phenols by azeotropic distillation with organic solvents capable of forming azeotropes with the dihydric phenol. Azeotrope-forming solvents suggested for this purpose in U. S. 1,912,628 are xylene, monochlorotoluene, monochloroxylene, monochlorobenzene, ortho-dichlorobenzene, and 1,2,4-trichlorobenzene. All of these solvents form azeotropes relatively low in dihydric phenol content and are, therefore, low in efficiency.

Now in accordance with the present invention, it has been found that chlorinated biphenyl containing about 20% to about 35% combined chlorine is a much more efficient azeotrope former and forms an azeotrope from which the distilled dihydric phenol separates in crystalline form on cooling. Thus, it has been found that a dihydric phenol is readily purified and the dihydric phenol easily recovered from the purification process in crystalline form by azeotropically distilling a chlorinated biphenyl containing about 20% to about 35% combined chlorine along with the dihydric phenol from a crude dihydric phenol. The dihydric phenol crystallizes from the chlorinated biphenyl on cooling. The process is particularly effective for purifying crude dihydric phenol obtained in the acid-catalyzed cleavage of a dihydroperoxide of a diisopropylbenzene.

The chlorinated biphenyl is particularly well suited as an azeotrope distillation solvent for the dihydric phenols because it forms azeotropes containing up to about 45% of the dihydric phenol and the chlorinated biphenyl dissolves less than about 0.1% of the dihydric phenol at about 20° C. so that the azeotropic distillation is highly efficient and the dihydric phenol is easily separated from the chlorinated biphenyl by crystallization whereby the chlorinated biphenyl, thus reduced in dihydric phenol content, can be returned to the distillation cycle.

The process of this invention is more particularly set forth in the following specific examples. All parts and percentages in this specification and claims are by weight.

Example 1

The reaction mixture resulting from the cleavage of 17.7 parts 93% m-diisopropylbenzene dihydroperoxide using 2% sulfuric acid in acetone as cleavage catalyst was neutralized with a chemical equivalent amount of 50% $K_2CO_3$ solution and was then stripped of low boiling impurities. Then 30 parts chlorinated biphenyl of about 32% combined chlorine content was added and the mixture was distilled at 150° C.–165° C. (15 mm. Hg pressure). The distillate on cooling to about 20° C. yielded about 6 parts resorcinol which after washing with cold benzene gave 5.5 parts resorcinol, M. P. 108–110° C.

Example 2

Example 1 was repeated omitting the neutralization of the sulfuric acid cleavage catalyst with substantially the same result.

Example 3

Air-oxidized m-diisopropylbenzene amounting to 50.2 parts and containing 9.7 parts monohydroperoxide and 32.1 parts dihydroperoxide was cleaved by gradually adding to a refluxing (60° C.) solution of 65 parts acetone containing 0.1 part concentrated sulfuric acid. The reaction mixture was heated for about 15 minutes and then neutralized by adding 0.25 part 50% aqueous potassium carbonate solution. The acetone was removed under reduced pressure and 75 parts chlorinated biphenyl containing 32% combined chlorine was added. The chlorinated biphenyl azeotrope was distilled off at 90–175° C. (10 mm. Hg pressure) in an amount of 95.7 parts. Resorcinol recovered as crystals from the chlorinated biphenyl amounted to 8.5 parts, M. P. 107–110° C. From the chlorinated biphenyl, m-isopropylphenol was recovered by extraction with aqueous sodium hydroxide solution and the chlorinated biphenyl was re-used in a subsequent azeotropic distillation.

Example 4

A mixture of 5 parts commercial resorcinol and 25 parts chlorinated biphenyl containing about 32% combined chlorine and having a boiling range of 290–325° C. at 760 mm. Hg pressure was distilled at 18 mm. Hg pressure. A fraction boiling in the range 149–168° C. amounting to 14.5 parts yielded about 5 parts crystalline resorcinol on cooling. These crystals after displacement wash with petroleum ether melted at 105–108° C. The second distillation fraction boiling in the range 168–192° C. yielded no crystals and contained only a trace of resorcinol.

Example 5

Example 4 was repeated with a chlorinated biphenyl containing about 21% combined chlorine and having a boiling range of 275–320° C. at atmospheric pressure. The first azeotropic distillation fraction boiling at 132–134° C. (18 mm. Hg. pressure) yielded 3.8 parts resorcinol, M. P. 105–110° C. and the second fraction, boiling point 134–140° C. (18 mm. Hg pressure), yielded 1.0 part resorcinol, M. P. 106–109° C.

Example 6

A mixture of 25 parts of commercial hydroquinone and 125 parts chlorinated biphenyl containing about 32% combined chlorine was distilled at 20 mm. Hg pressure. A fraction boiling in the range 135–168° C., amounting to 44.2 parts, yielded hydroquinone in the amount of 6 parts after filtration and washing of the crystals. This hydroquinone had a melting point of 178° C. A second fraction, boiling in the range 165–185° C., amounted to 85.2 parts and yielded about 19 parts of washed crystals of hydroquinone, melting at 174–176° C.

Example 7

A mixture of 25 parts of commercial pyrocatechol and 125 parts chlorinated biphenyl containing about 32% combined chlorine was distilled at 20 mm. Hg pressure. A fraction boiling in the range 135–168° C., amounting to 50.4 parts, yielded 23.3 parts of pyrocatechol after washing. This material melted at 104–105° C.

Example 8

The reaction mixture from the cleavage of 100 parts of p-diisopropylbenzene oxidate, containing 49.3% p-diisopropylbenzene dihydroperoxide and 31.6% p-diisopropylbenzene monohydroperoxide, was stripped of acetone after neutralization of the acid catalyst with magnesium oxide. The residue was cooled to crystallize and the crude crystalline hydroquinone contaminated with p-isopropylphenol was filtered off. This crystalline material was then distilled in the presence of about 100 parts of chlorinated biphenyl containing about 32% combined chlorine. From the distillate was obtained by filtration and washing 20.3 parts of crystalline hydroquinone. p-Isopropylphenol was extracted from the filtrate with caustic solution and recovered by acidification of the caustic extract.

The chlorinated biphenyl useful in this invention is a chlorine-substituted biphenyl wherein there are 1 to 2 chlorine substituents. The position of the chlorine is not generally critical since the o-, m-, and p-monochlorobiphenyls are all operable, as also is the p,p'-dichlorobiphenyl. The individual isomers all melt above 30° C., however. It is, therefore, preferable to use a mixture of two or more isomers so as to obtain a liquid distillate from which only the dihydric phenol crystallizes. Such a mixture of isomers which it is preferred to use is the product of chlorination of biphenyl with chlorine gas and having from about 20% to about 35% combined chlorine and boiling in the range of about 275° C. to about 320° C. for the former and in the range of about 290° C. to about 325° C. for the latter.

The azeotropic distillation may be carried out at either reduced pressure, atmospheric pressure, or slightly elevated pressure. The azeotrope is richer in dihydric phenol at the higher temperatures and the temperature is variable with the pressure. The temperature of distillation thus may be selected by proper choice of chlorinated biphenyl distillation fraction or by proper choice of pressure. It is preferable to carry out the azeotropic distillation at reduced pressure in the range of about 10 to about 50 mm. Hg. However, pressures as low as 0.1 mm. Hg pressure are operable.

The chlorinated biphenyl from which the dihydric phenol has been separated by filtration is recycled to the azeotropic distillation. After several recycles the chlorinated biphenyl should be purified to avoid contamination of the crystallized dihydric phenol with impurities. This may be accomplished by caustic washing to remove impurities followed by fractional distillation or by substituting decolorizing charcoal for the cautic prior to distillation. In the distillation, close fractionation whereby crystalline chlorinated biphenyl cuts are obtained is to be avoided.

The process of this invention is operable with resorcinol, hydroquinone and pyrocatechol and is particularly well suited for purification of these dihydric phenols containing genetic impurities formed in the process of oxidizing the corresponding diisopropylbenzene to the dihydroperoxide and subsequently subjecting the dihydroperoxide to acid-catalyzed cleavage. The crude cleavage mixture can be freed of low boiling impurities before or after adding the chlorinated biphenyl. If isopropylphenol is present as an impurity during the azeotropic distillation, it will distill over but will not crystallize out of the chlorinated biphenyl. It can be removed after crystallizing out the dihydric phenol by extraction with caustic as in Examples 3 and 8.

What I claim and desire to protect by Letters Patent is:

1. The method of purifying a dihydric phenol of the group consisting of resorcinol, hydroquinone and pyrocatechol which comprises distilling said dihydric phenol as an azeotrope with a chlorinated biphenyl containing about 20% to about 35% combined chlorine and separating said dihydric phenol from the distillate.

2. The process of claim 1 in which the dihydric phenol is hydroquinone.

3. The process of claim 1 in which the dihydric phenol is resorcinol.

4. The process of claim 1 in which the dihydric phenol is pyrocatechol.

5. The method of purifying a dihydric phenol of the group consisting of resorcinol, hydroquinone and pyrocatechol containing genetic impurities formed in the cleavage of a diisopropylbenzene hydroperoxide to said dihydric phenol which comprises distilling said dihydric phenol as an azeotrope with a chlorinated biphenyl containing about 20% to about 35% combined chlorine and separating said dihydric phenol from the distillate.

6. The method of purifying a dihydric phenol of the group consisting of resorcinol, hydroquinone and pyrocatechol which comprises distilling said dihydric phenol as an azeotrope with a chlorinated biphenyl containing about 20% to about 35% combined chlorine and crystallizing said dihydric phenol from the distillate.

7. The method of purifying a dihydric phenol of the group consisting of resorcinol, hydroquinone and pyrocatechol which comprises distilling said dihydric phenol as an azeotrope with a chlorinated biphenyl containing about 20% to about 35% combined chlorine, separating said dihydric phenol from the distillate, and recycling the chlorinated biphenyl to the distillation step.

8. The process of claim 6 in which the dihydric phenol is hydroquinone.

9. The process of claim 6 in which the dihydric phenol is resorcinol.

10. The process of claim 6 in which the dihydric phenol is pyrocatechol.

References Cited in the file of this patent
UNITED STATES PATENTS

| | | |
|---|---|---|
| 1,784,711 | Suida | Dec. 9, 1930 |
| 1,821,815 | Parkes | Sept. 1, 1931 |
| 1,912,628 | Elliott | June 6, 1933 |